J. BURCHELL.
HARVESTER SUPPORTING ATTACHMENT FOR A TRACTOR.
APPLICATION FILED JAN. 11, 1916.
1,196,430.
Patented Aug. 29, 1916.
4 SHEETS—SHEET 4.
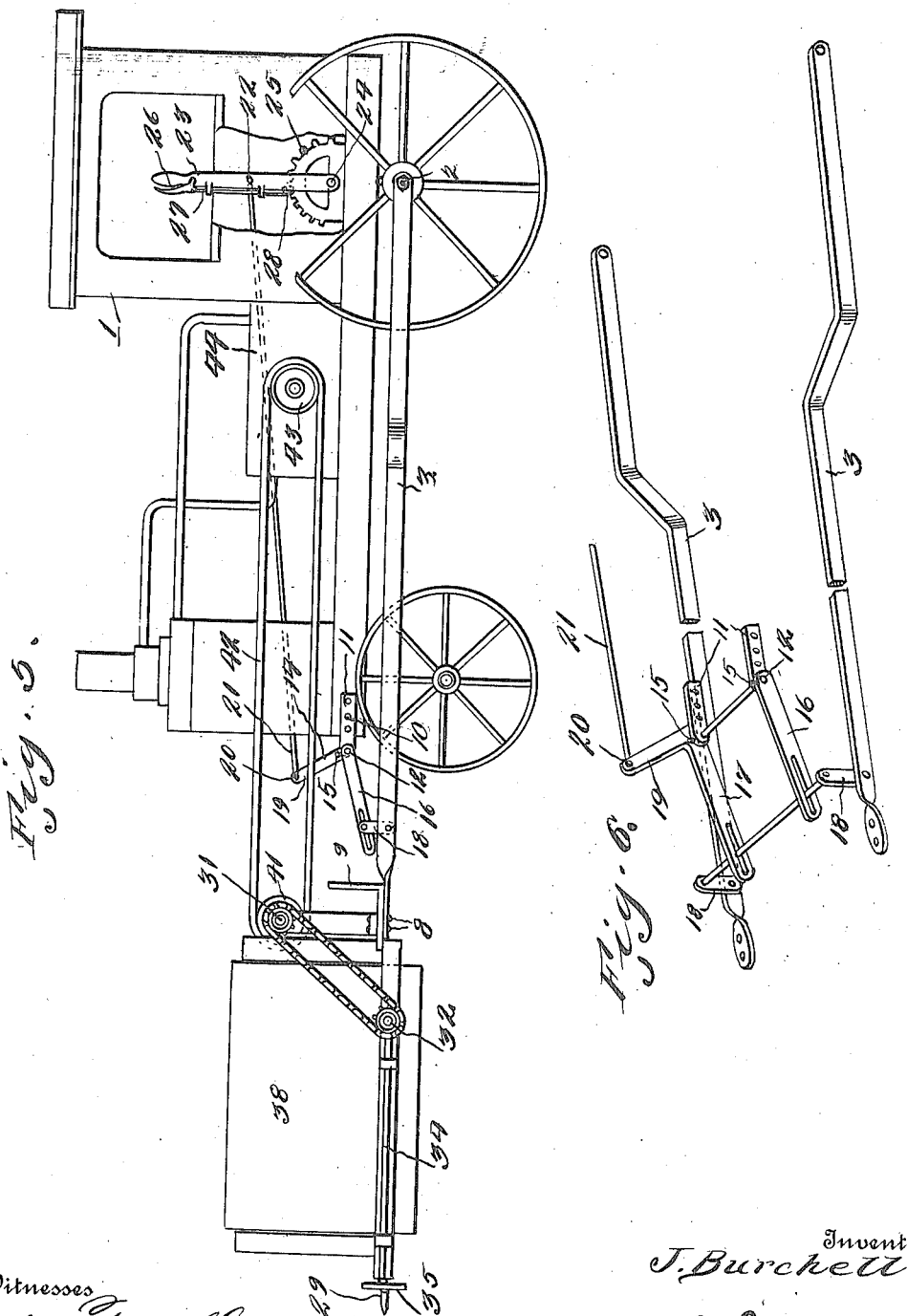

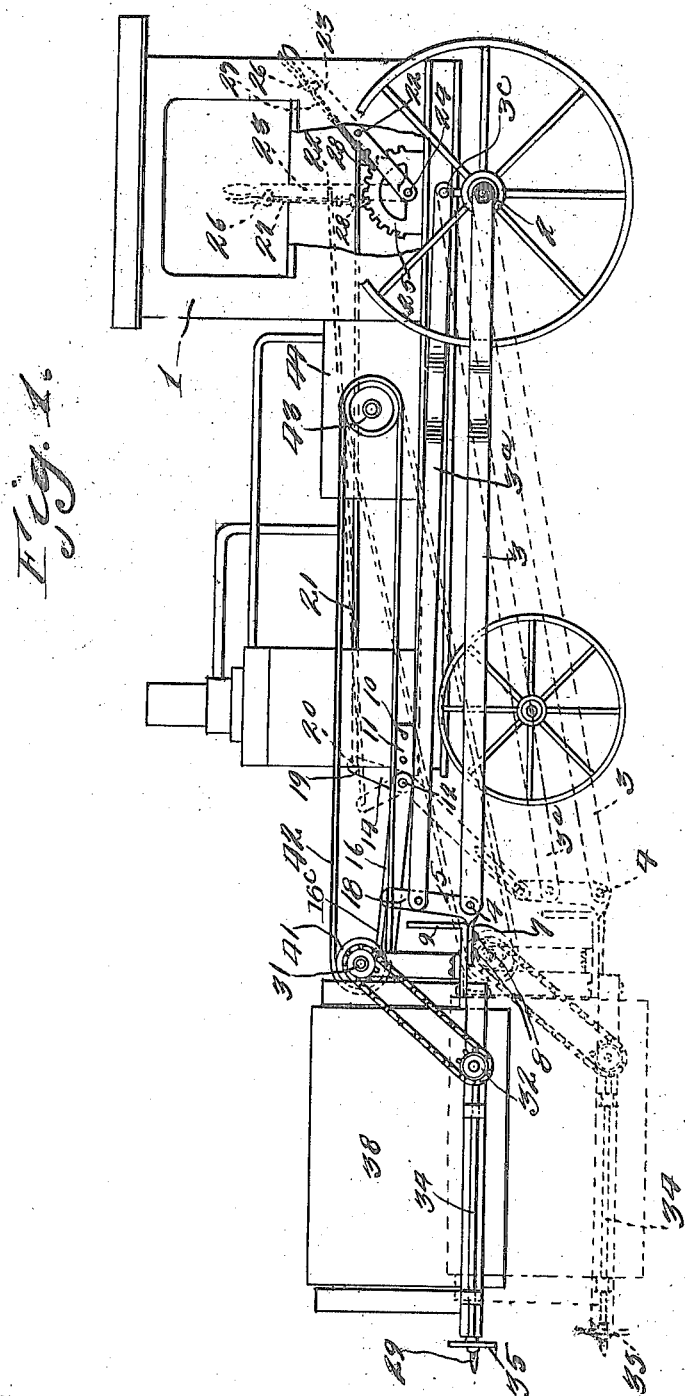

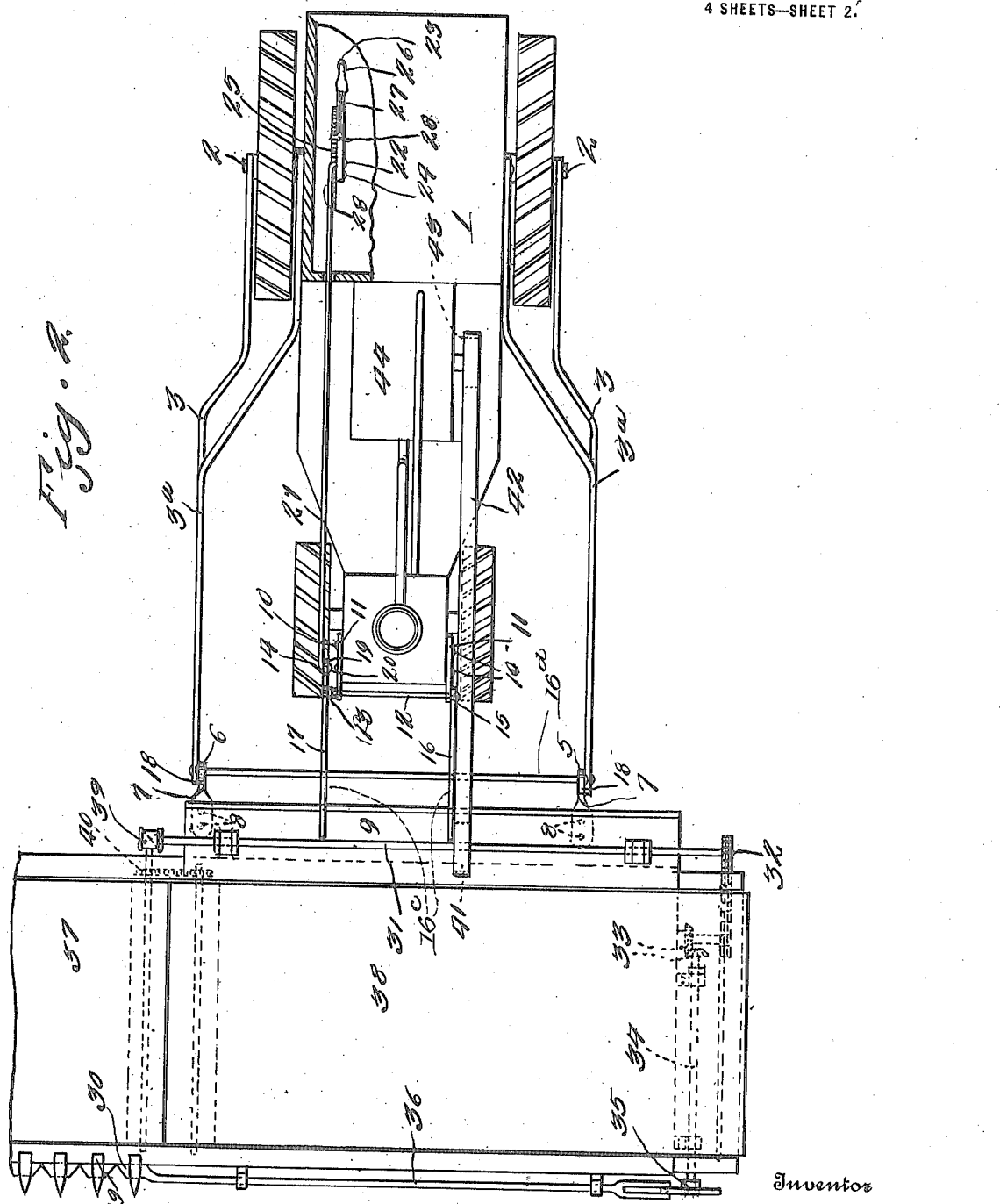

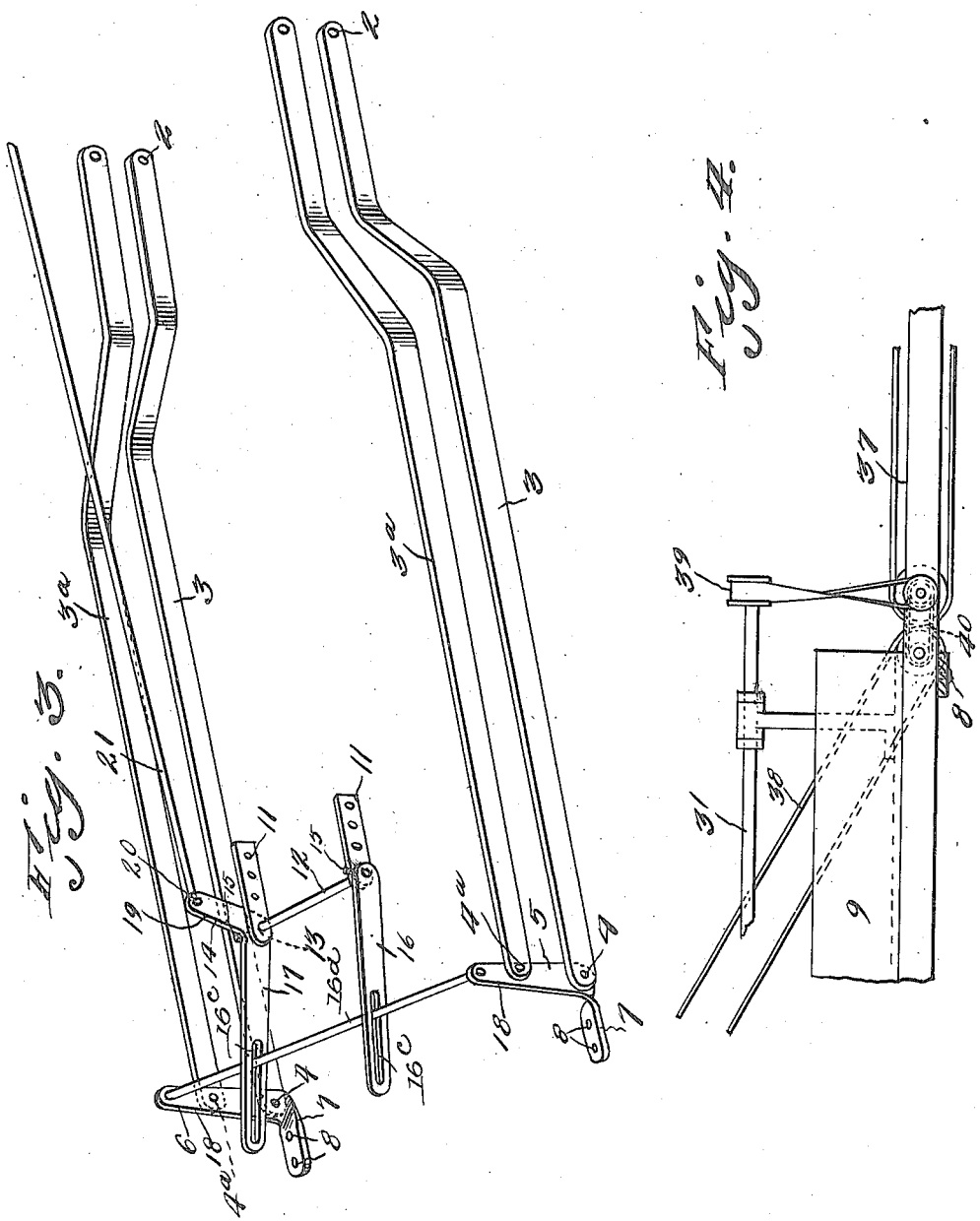

UNITED STATES PATENT OFFICE.

JOSEPH BURCHELL, OF MINDEN, NEBRASKA.

HARVESTER-SUPPORTING ATTACHMENT FOR A TRACTOR.

1,196,430.  Specification of Letters Patent.  Patented Aug. 29, 1916.

Application filed January 11, 1916. Serial No. 71,550.

*To all whom it may concern:*

Be it known that I, JOSEPH BURCHELL, a citizen of the United States, residing at Minden, in the county of Kearney, State of Nebraska, have invented a new and useful Harvester-Supporting Attachment for a Tractor; and I do hereby declare the following to be a full, clear, and exact description of the invention, such as will enable others skilled in the art to which it appertains to make and use the same.

This invention relates to a tractor harvester and particularly to improved means for supporting the harvester in front of the tractor, whereby the harvester may be raised and lowered at will by the operator.

One of the features of the invention is the provision of means whereby as the harvester is raised and lowered, it will be maintained substantially in a horizontal plane parallel with the surface of the ground.

The invention comprises further features and combination of parts, as hereinafter set forth, shown in the drawings and claimed.

In practical fields the details of construction may necessitate alterations, falling within the scope of what is claimed.

In the drawings: Figure 1 is a view in side elevation of a tractor, showing the improved combined supporting and raising and lowering means applied thereto, for supporting a harvester in different adjusted positions in front of the tractor. Fig. 2 is a plan view. Fig. 3 is an enlarged detail view of the harvester supporter and raising and lowering means. Fig. 4 is a detail view through the connections between a driven shaft and the conveyer belts for handling the grain or the like. Fig. 5 is a view in side elevation of the machine, showing the two bars dispensed with, and only one bar 3 used. Fig. 6 is a detail perspective view of the structure shown in Fig. 5.

Referring more especially to the drawings, 1 designates a tractor which may be of any suitable or conventional construction, and pivoted on the rear axle of the tractor as shown at 2 is a pair of parallel bars 3, one upon each side of the tractor. These bars 3 extend forwardly and terminate beyond the forward portion of the tractor. Pivoted at 3$^c$ to the opposite sides of the frame of the tractor at its rear portion are the bars 3$^a$, which are in parallelism to the bars 3 and spaced above said bars 3. The forward ends of the bars 3$^a$ are pivoted at 4$^a$ as shown clearly in Fig. 3 of the drawings, to the arms 18 of the bell crank levers 5 and 6. Pivoted at 4 to the forward ends of the bars 3 are bell crank levers 5 and 6, the arms 7 of which are secured at 8 to the frame 9 of the harvester. Secured at 10 to both sides of the frame of the tractor at its forward end are plates 11, in the forward ends of which a rock shaft 12 is mounted. Secured at 13 by a set screw to one end of the shaft 12 to rock therewith is a bell crank lever 14. Secured by a set screw 15 to the other end of the rock shaft to move therewith is an arm 16. The arm 17 of the bell crank lever 14 and the arm 16 are provided with slots 16$^c$, through which a rod 16$^d$ extends, which rod 16$^d$ connects the arms 18 of the bell crank levers 5 and 6 thereby connecting said parts. Connected to the arm 19 as at 20 of the bell crank lever 14 is a rod 21, which in turn is pivoted at 22 to a lever 23, which is pivoted at 24 to a segmental rack plate 25 carried by the rear part of the tractor.

The lever 23 is provided with the usual hand grip 26 having a rod connection 27 to the dog 28. It is to be noted that by moving the lever 23 forwardly upon its pivot the bell crank lever 14 and the arm 16 will be rocked to permit the bars 3 and 3$^a$ to lower upon their pivots, so that the harvester will be lowered substantially in a horizontal plane parallel with the surface of the ground. It is to be noted that by provision of the bars 3 and 3$^a$, so arranged and connected as shown to the bell crank levers 5 and 6, the harvester will be lowered substantially in parallelism with the ground. A backward movement of the lever 23 will raise the harvester. The dog 28 coöperates with the teeth of the rack plate, to hold the lever 23 in different adjusted positions, which will hold the harvester in different adjusted positions.

The harvester may be constructed in any suitable or conventional manner, and as an example the harvester is provided with a cutting mechanism 29, the cutting bar 30 of which is operated from the driven shaft 31 through the gear connections 32, 33, shaft 34 and eccentric and rod connections 35 and 36. It is also to be noted that the shaft 31 operates the conveyers 37 and 38 through the belt connections 39 and 40, to handle the grain in such a manner as to carry it to one side of the machine and allowed to deposit in the field. The shaft 31 has a pulley 41, about which the belt 42 (which in turn is operated by the pulley 43 of the conventional form of engine 44 of the tractor) operates, to impart motion to the shaft 31.

The invention having been set forth, what is claimed as new and useful is:—

In combination with a tractor, a harvester, a pair of bars, pivotally mounted upon the rear axle of the tractor extending forwardly and beyond the front end of the tractor, one upon each side, a pair of bars pivoted at the rear of the frame of the tractor, one upon each side just a little above the pivots of the first bars, a pair of bell crank levers having their corresponding vertical arms pivoted to the forward ends of both pairs of bars and having their substantially horizontal arms fixed to the frame of the harvester, a rock shaft mounted in bearings of the tractor, a bell crank lever on said rock shaft at one end, an arm fixed to the rock shaft, which arm of the rock shaft and one of the arms of the bell crank lever of said rock shaft having elongated slots, a transverse rod connecting corresponding upper extremities of the vertical arms of the first bell crank levers and extending through said elongated slots, means carried by the tractor having connections with the other arm of the bell crank lever of said rock shaft, to rock said bell crank lever to raise and lower the harvester, said means comprising a lever and a rod connected to the bell crank lever of said rock shaft, and a dog and rack for holding said last named lever in adjusted positions, and connections between the engine of the tractor and the harvester for operating the harvester.

In testimony whereof I have signed my name to this specification in the presence of two subscribing witnesses.

JOSEPH BURCHELL.

Witnesses:
C. P. UNDERBERG,
JOHN A. PETERSON.